US011930153B2

United States Patent
Bauer et al.

(10) Patent No.: US 11,930,153 B2
(45) Date of Patent: Mar. 12, 2024

(54) FEATURE EXTRACTIONS TO OPTIMIZE SCANNED IMAGES

(71) Applicants: Hewlett-Packard Development Company, L.P., Spring, TX (US); PURDUE RESEARCH FOUNDATION, West Lafayette, IN (US)

(72) Inventors: Peter Bauer, Boise, ID (US); Todd J. Harris, Boise, ID (US); Mark Shaw, Boise, ID (US); Jan Allebach, West Lafayette, IN (US); Yafei Mao, West Lafayette, IN (US); Yufang Sun, West Lafayette, IN (US); Lixia Li, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/271,094

(22) PCT Filed: Jan. 8, 2021

(86) PCT No.: PCT/US2021/012651
§ 371 (c)(1),
(2) Date: Jul. 6, 2023

(87) PCT Pub. No.: WO2022/150042
PCT Pub. Date: Jul. 14, 2022

(65) Prior Publication Data
US 2024/0056547 A1    Feb. 15, 2024

(51) Int. Cl.
*H04N 1/62* (2006.01)
*G06V 30/413* (2022.01)

(52) U.S. Cl.
CPC ........... *H04N 1/626* (2013.01); *G06V 30/413* (2022.01)

(58) Field of Classification Search
CPC ...................................... H04N 1/626
See application file for complete search history.

(56) References Cited

U.S. PATENT DOCUMENTS 5,016,096 A * 5/1991 Matsunawa ............ H04N 1/626
358/448
5,201,011 A     4/1993 Bloomberg et al.
(Continued)

FOREIGN PATENT DOCUMENTS

| CN | 107025456 A | 8/2017 | |
|---|---|---|---|
| EP | 0996080 A2 | 4/2000 | |
| JP | 2019192999 A * | 10/2019 | ......... G06K 9/00442 |

OTHER PUBLICATIONS

Jake Grieve; "Scanning Highlighted Text—Which Color Highlighter Should You Use", Apr. 3, 2013, pp. 3.

*Primary Examiner* — Ted W Barnes
(74) *Attorney, Agent, or Firm* — Brooks, Cameron & Huebsch, PLLC

(57) ABSTRACT

In some examples, an imaging device can include a processing resource and a memory resource storing instructions to cause the processing resource to perform a feature extraction process to extract a gamut-based feature included in a plurality of pixels of a scanned image to determine whether the scanned image includes a particular marking, apply a classification model to the scanned image, and optimize the scanned image based on the classification of the scanned image.

15 Claims, 5 Drawing Sheets

(56) References Cited

U.S. PATENT DOCUMENTS

| | | | |
|---|---|---|---|
| 5,619,592 A | | 4/1997 | Bloomberg et al. |
| 5,933,256 A | * | 8/1999 | Ebner .................. H04N 1/6075 |
| | | | 358/518 |
| 2003/0123723 A1 | * | 7/2003 | D'Souza .............. H04N 1/6033 |
| | | | 382/162 |
| 2006/0062453 A1 | * | 3/2006 | Schacht ............. G06V 30/1444 |
| | | | 382/164 |
| 2006/0096483 A1 | * | 5/2006 | Andreas ............... H04N 1/6058 |
| | | | 101/484 |
| 2008/0043271 A1 | * | 2/2008 | Gil ....................... H04N 1/6033 |
| | | | 358/1.9 |
| 2009/0116756 A1 | | 5/2009 | Neogi et al. |
| 2009/0185201 A1 | * | 7/2009 | Lin ........................ H04N 1/603 |
| | | | 358/1.9 |
| 2010/0182659 A1 | * | 7/2010 | Ochs ........................ H04N 1/54 |
| | | | 358/515 |
| 2011/0141521 A1 | * | 6/2011 | Qiao .................. H04N 1/32144 |
| | | | 382/218 |
| 2016/0284106 A1 | * | 9/2016 | Mikuriya ........... H04N 1/00023 |
| 2018/0084156 A1 | * | 3/2018 | Li ........................ H04N 1/6019 |

\* cited by examiner

FEATURE EXTRACTIONS TO OPTIMIZE SCANNED IMAGES

BACKGROUND

Imaging devices, such as printers, copiers, etc., may be used to scan a physical medium and/or form markings on the physical medium, such as text, images, etc. In some examples, imaging devices may scan a physical medium by performing a scan job. A scan job can include scanning markings, such as text, images, and/or other markings on the physical medium and converting them to digital form. In some examples, imaging devices may form markings on another physical medium by performing a print job. A print job can include forming markings such as text, images, and/or other markings by transferring a print material (e.g., ink, toner, etc.) to a physical medium. In some examples, the print job can include forming markings that represent the digital form of a previously scanned physical medium.

DETAILED DESCRIPTION

Figure 1:
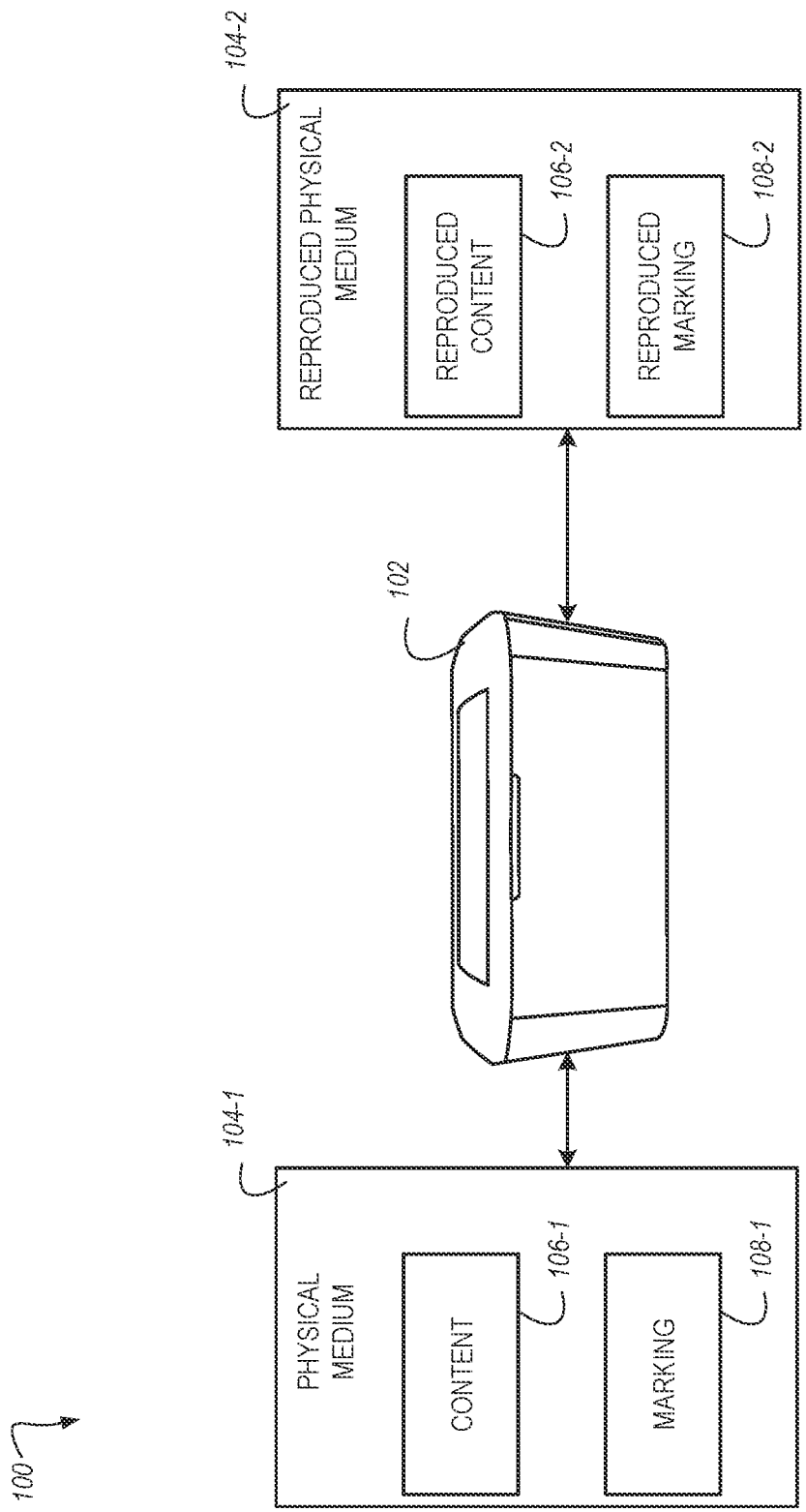
FIG. 1 is an example of a system for feature extractions to optimize scanned images consistent with the disclosure.

Imaging devices can be utilized to perform scanning and/or printing jobs. As used herein, the term "imaging device" refers to any hardware imaging device with functionalities to scan a physical medium including representation(s) (e.g., text, images, models, markings, etc.) and transform the representation(s) to digital form and/or to physically produce representation(s) on another medium. In some examples, a "medium" may include paper, photopolymers, plastics, composite, metal, wood, fabric, or the like. An imaging device can be a scanning and/or printing device (e.g., a printer). An imaging device can include scanning, printing, faxing, and/or other imaging device functionalities, and can perform scan jobs and/or print jobs when in receipt of a scan job request and/or a print job request, respectively, from a computing device or other network (e.g., Internet) connected device.

Certain physical media for scanning may include representation(s) that may be incorrectly reproduced after a scan job. For example, certain markings such as a highlighting mark included on a physical medium for a scanning may not be accurately reproduced after a scan job. For instance, the highlighting mark may be a bright yellow color on the physical medium. During a scan job, the highlighting mark may not be accurately scanned due to its bright color. Furthermore, if the highlighting mark is accurately scanned, the highlighting mark may not be accurately reproduced during a subsequent print job. This may happen if, for instance, the color gamut of the imaging device (e.g., for scanning) is sufficient to detect the highlighting mark, but the color gamut of the imaging device (e.g., for printing) may not be sufficient to print the highlighting mark. As a result, the reproduction of the scanned physical medium may not include an accurate reproduction of the highlighting mark included on the originally scanned physical medium.

Past approaches to account for such marks may include prompting a user, via a user interface, to modify image quality settings of scanned physical medium in order to accurately reproduce such a highlighting mark. For example, a user may be able to modify image quality settings via manual selection of such settings via the user interface of the imaging device, connected computing device, connected mobile device, etc. However, such an approach may depend on the user having some level of past experience, expertise, training etc. in order to modify the image quality settings to accurately reproduce the highlighting mark. In some examples, users without such experience, expertise, or training may not be able to accurately reproduce the highlighting mark.

Further, in some examples, some such marks may result in reproduction with different characteristics altogether. For instance, a bright fluorescent highlighter mark may, in some examples, be reproduced with colors that are lighter or darker than the original highlighter mark, or even change colors (e.g., from yellow to green, etc.) during reproduction (e.g., digitally or as a subsequent print job on a physical medium). Further, such a mark may disappear completely during a print job while the mark is intended to be included in the print job. This may result in customer frustration and/or dissatisfaction.

Feature extractions to optimize the processing of scanned images, according to the disclosure, can allow for reliable reproduction of markings on a physical medium when scanned during a scan job, as well as reproduction of such markings on a resulting physical medium produced during a print job. Extraction of gamut-based features from a scanned physical medium and application of a classification model to such extracted gamut-based features can allow for reliable reproduction of marks included on the scanned physical medium, as well as automatic optimization of an image resulting from the scanned physical medium. Such automatic optimization can allow for a more user-friendly approach that can more accurately reproduce a scanned physical medium, even in imaging devices that may include less robust scanning and/or printing capabilities, as compared with previous approaches.

FIG. 1 is an example of a system 100 for feature extractions to optimize scanned images consistent with the disclosure. The system 100 can include an imaging device 102, a scanned physical medium 104-1, and a reproduced physical medium 104-2. The scanned physical medium 104-1 can include content 106-1 and a marking 108-1. The reproduced physical medium 104-2 can include reproduced content 106-2 and a reproduced marking 108-2.

As illustrated in FIG. 1, the system 100 can include an imaging device 102. As described above, the imaging device 102 can be a scanning and/or printing device. The imaging device 102 can, for instance, scan the physical medium 104-1 (including the text 106-1 and the marking 108-1) and generate the reproduced physical medium 104-2 (including the reproduced text 106-2 and the reproduced marking 108-2), as is further described herein.

The imaging device 102 can scan the physical medium 104-1 during a scan job. As described above, the physical medium 104-1 can be, as one example, paper which can include content 106-1 and a marking 108-1. As used herein, the term "content" refers to any text, images, models, etc. that are formed on the physical medium 104-1. For example, the content 106-1 can include any one or combination of text (e.g., alphanumeric characters), images (e.g., photographs, digitally created images, etc.), among other types of content 106-1.

The physical medium 104-1 can further include a marking 108-1. As used herein, the term "marking" refers to a visible trace on a physical medium. For example, the marking 108-1 can be a highlighter mark. For instance, a user may highlight certain content 106-1 (e.g., text) using a highlighter to create the marking 108-1 by depositing ink (e.g., transparent fluorescent ink) or other material onto the physical medium 104-1. The marking 108-1, when made by a highlighter, can be in some examples a vivid translucent color that can draw attention to the content 106-1. The user may, for instance, create the marking 108-1 in order to draw attention to a meaningful piece of text included in the content 106-1.

The user may desire to scan the physical medium 104-1 in order to create a reproduced physical medium 104-2. As used herein, the term "reproduced physical medium" refers to a copy of an original physical medium including the same content and marks. The reproduced physical medium 104-2 can be a physical reproduction (e.g., copied) and/or a digital version of the physical medium 104-1 (e.g., scanned and saved in a digital format for storage, transmission (e.g., via email, facsimile, etc.)). For example, the user may desire to create a digital form (e.g., in Portable Document Format (PDF), JPEG, Tag Image File Format (TIFF), etc.) of the physical medium 104-1 by scanning the physical medium 104-1 via the imaging device 102. Additionally and/or alternatively, the user may desire to make a copy of the physical medium 104-1 by scanning the physical medium 104-1, via the imaging device 102, and causing the imaging device 102 to create a reproduced physical medium 104-2 that includes the reproduced content 106-2 and the reproduced marking 108-2 as they are on the physical medium 104-1.

As described above, in some instances, certain markings 108-1 may not be reproducible by an imaging device due to differences between the color gamut of the scanner of the imaging device 102 and the color gamut of the printer of the imaging device 102. Feature extractions to optimize scanned images according to the disclosure can be utilized to accurately reproduce such markings 108-1, As is further described in connection with FIGS. 3 and 4, the imaging device 102 can include a processing resource to perform steps related to feature extractions to optimize scanned images, as is further described herein.

When the physical medium 104-1 is scanned by the imaging device 102, the imaging device 102 can convert the physical medium 104-1 (e.g., including the content 106-1 and the marking 108-1) into a plurality of pixels that comprise a scanned image representing the physical medium 104-1. As used herein, the term "scanned image" refers to a digital image of a physical medium that is optically scanned. As used herein, the term "pixel" refers to the smallest controllable element of an image represented on a display screen.

The imaging device 102 can perform a feature extraction process to extract gamut-based features included in the plurality of pixels of the scanned image to determine whether the scanned image includes the particular marking 108-1. As used herein, the term "gamut-based feature" refers to a characteristic relating to a reproducible color range of a device. As used herein, the term "feature extraction process" refers to a series of actions directed to locating a characteristic of a scanned image. For example, the imaging device 102 can perform a feature extraction process retrieve and characterize pixels from the scanned image that include the marking 108-1, as is further described herein, where the marking 108-1 can be a highlighter marking.

The feature extraction process can include converting a color space of the plurality of pixels of the scanned image from an input color space to an output color space. As used herein, the term "color space" refers to a particular organization of colors. The plurality of pixels of the scanned image can be scanned by the imaging device 102 in the input color space. For example, the input color space can be a red, green, and blue (RGB) color space. Since the RGB color space is not perceptually uniform (e.g., the distance between the RGB coordinates of two colors is not proportional to human perception), it can be useful to convert the input color space (e.g., RGB) to an output color space that is perceptually uniform. Such perceptually uniform color spaces can result in a better optimized final image as compared with non-perceptually uniform color spaces.

The RGB input color space can be converted to a polar coordinate representation of an opponent color space. For example, the RGB input color space can be converted to an Lch output color space. The conversion process from RGB to Lch can be as follows. The RGB input color space can be converted to CIE XYZ, from CIE XYZ to CIE L*a*b, and finally from CIE L*a*b* to CIE Lch(a*b*) (referred to herein as Lch). Accordingly, the plurality of pixels can be converted from the input color space (e.g., RGB) to the output color space (Lch). The color attributes of the plurality of pixels in the Lch color space can include a lightness channel (e.g., "L" which corresponds to how light or dark a color is), a chroma channel (e.g. "c" which represents a color intensity), and a hue channel (e.g., "h" which represents the appearance of a color), as are further utilized herein.

Although the input color space is described as the RGB color space and the output color space is described as the Lch color space, examples of the disclosure are not so limited. For example, the input color space and the output color space can be any other combination of color spaces (e.g., CIECAM, R lab, HSV (hue, saturation, value), etc.).

The imaging device 102 can then segment the output color space into a plurality of hue segments each including a subset of pixels of the plurality of pixels. As used herein, the term "hue segments" refers to partitioned colors included in a color space. For example, the imaging device 102 can segment the output color space into twelve non-overlapping 30-degree hue segments, where each hue segment can include a subset of pixels that are of a certain hue. For example, the imaging device 102 can segment the output color space into red, rose, magenta, violet, blue, azure, cyan, spring green, green, chartreuse green, yellow, and orange hue segments, although examples of the disclosure are not limited to such hue segments.

Although the output color space is described above as being segmented into twelve non-overlapping 30-degree hue segments, examples of the disclosure are not so limited. For example, the imaging device can segment the output color space into eighteen non-overlapping 20-degree hue segments. Further, in some examples the plurality of hue segments can be overlapping.

As described above, the imaging device 102 can include a scanner color gamut and a printer color gamut. The scanner color gamut can refer to the range of colors that can be sensed by the scanner and the printer color gamut can refer to the range of colors that can be printed by the printer. Generally, the printer color gamut is included within the scanner color gamut. That is, while the particular mark 108-1 (e.g., highlighting) may be sensed by the scanner of the imaging device 102 as the mark 108-1 is within the scanner color gamut, the particular mark 108-1 may not be able to be printed as the mark 108-1 is not within the printer color gamut. Accordingly, to determine whether the mark 108-1 is a highlighter mark, the imaging device 102 can determine, as part of the feature extraction process, which pixels of each hue segment are not included within the color gamut of the printer of the imaging device 102, as those pixels outside the color gamut of the printer are likely highlighter marks, as is further described herein.

The imaging device 102 can include a predefined imaging device color gamut. The predefined imaging device color gamut can also be segmented into twelve non-overlapping 30-degree hue segments. The imaging device 102 can compare, for each hue segment of the plurality of pixels of the scanned image, pixels included within each hue segment with a corresponding hue segment of the predefined imaging device color gamut. For example, the plurality of pixels included in the hue segment (e.g., −30-degrees to 0-degrees (e.g., red)) of the output color space of the scanned image can be compared against the corresponding predefined imaging device color gamut hue segment from −30-degrees to 0-degrees (e.g., red) of the predefined imaging device color gamut (e.g., as is further illustrated in connection with FIG. 2B). That is, each pixel included in the red hue segment of the output color space can be compared against the predefined red imaging device color gamut hue segment. The imaging device 102 can iterate this process through all of the twelve non-overlapping 30-degree hue segments. For example, the imaging device 102 can compare each pixel included in the orange hue segment of the output color space of the scanned image against the predefined orange imaging device color gamut hue segment, compare each pixel included in the yellow hue segment of the output color space of the scanned image against the predefined yellow imaging device color gamut hue segment, etc.

Figure 2A:
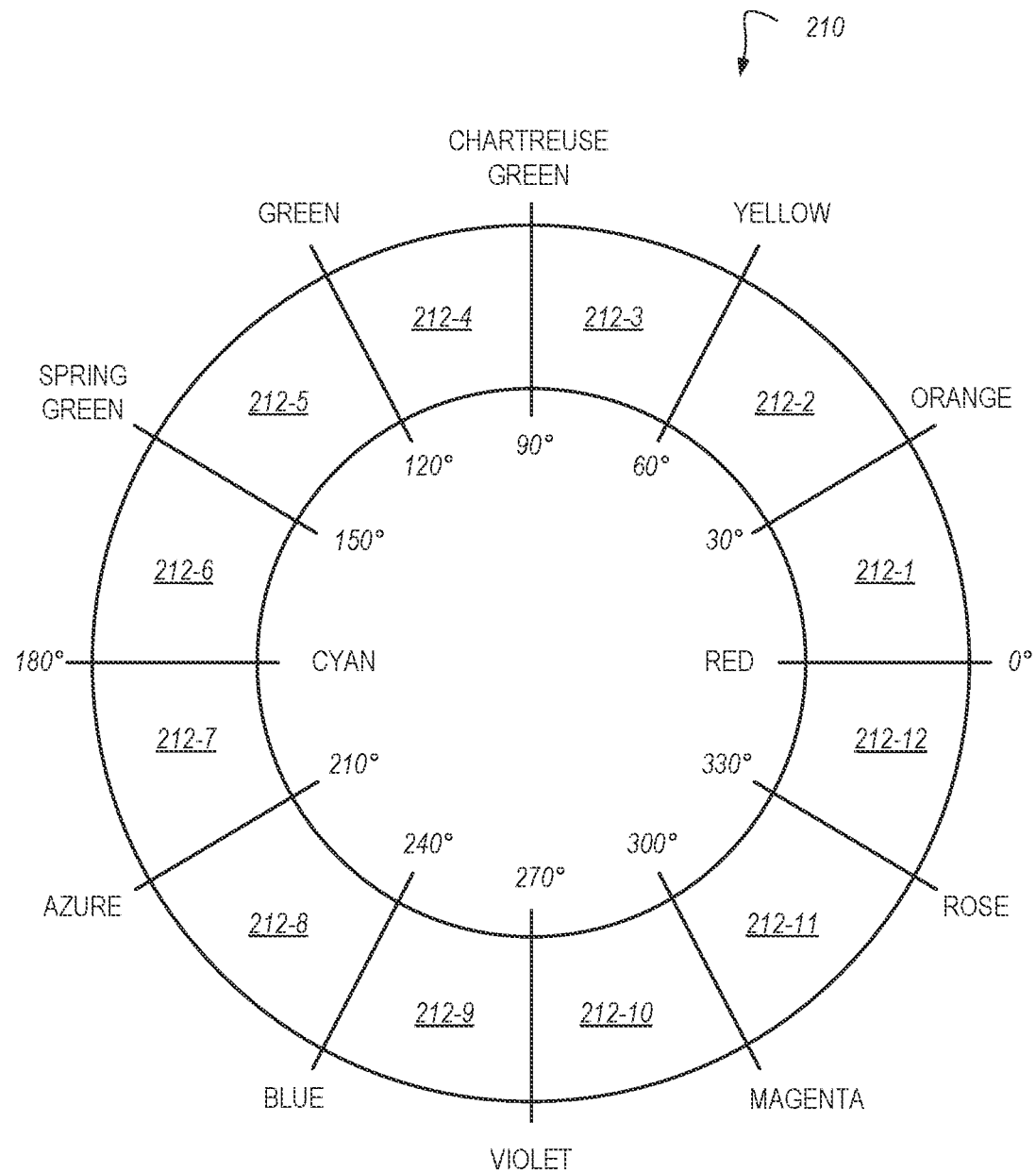
FIG. 2A is an example of a hue circle including hue segments for feature extractions to optimize scanned images consistent with the disclosure.
Figure 2B:
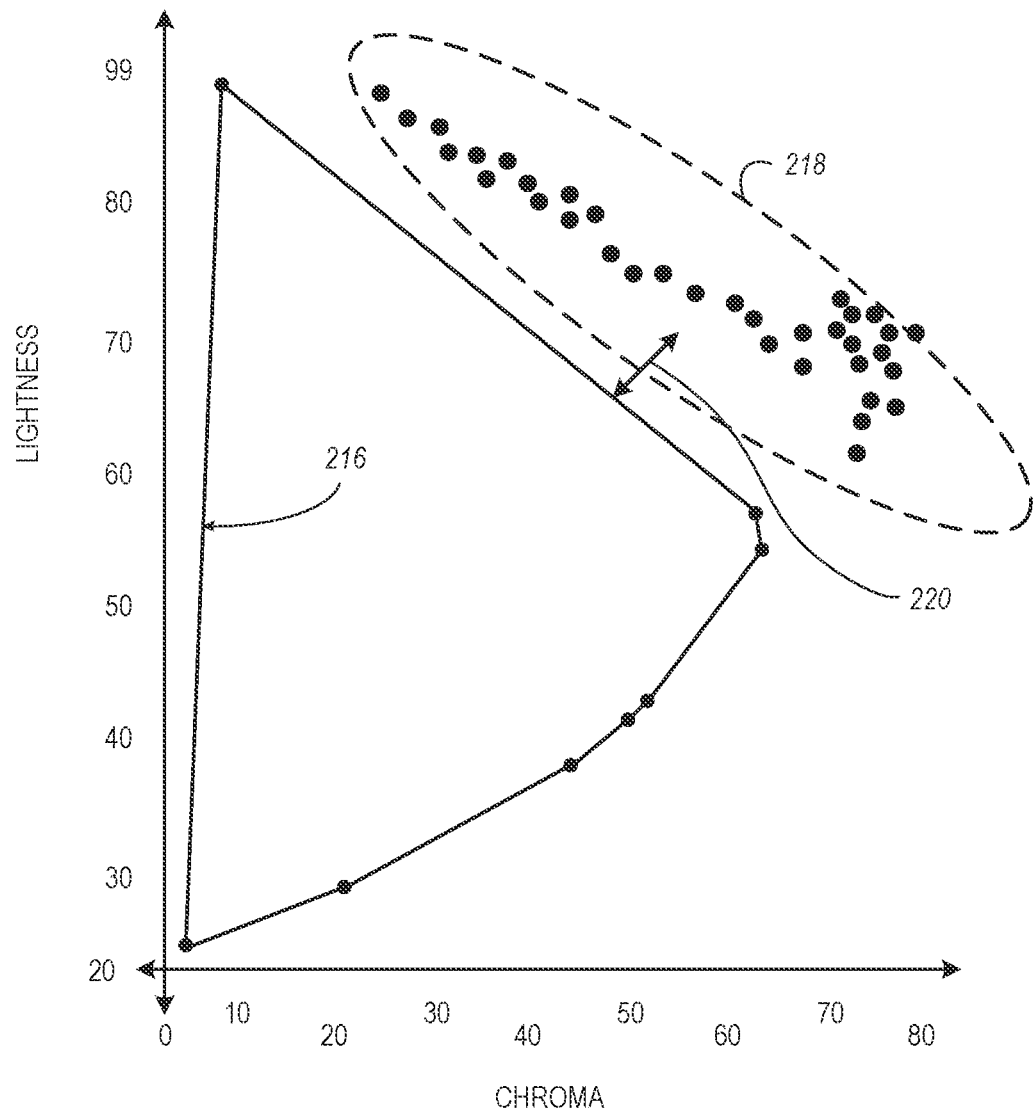
FIG. 2B is an example of an imaging device gamut segment for feature extractions to optimize scanned images consistent with the disclosure.

The imaging device 102 can determine a distance of each pixel from a boundary of each respective predefined imaging device gamut segment. Continuing with the example from above, the imaging device 102 can determine a distance of each pixel included in the red hue segment of the output color space from a boundary of the predefined red imaging device gamut segment. For example, each red pixel can include a chroma correlate value and lightness correlate value, and the boundary of the predefined red imaging device color gamut hue segment can include chroma correlate values and lightness correlate values. The imaging device 102 can determine a distance between each red pixel from the boundary of the predefined red imaging device color gamut hue segment using such chroma correlate and lightness correlate values (e.g., as is illustrated in FIG. 2B). The imaging device 102 can iterate this process through all of the twelve non-overlapping 30-degree hue segments. For example, the imaging device 102 can determine a distance between each orange pixel from the boundary of the predefined orange imaging device color gamut hue segment using such chroma correlate values and lightness correlate values, determine a distance between each yellow pixel from the boundary of the predefined yellow imaging device color gamut hue segment using such chroma correlate values and lightness correlate values, etc.

The imaging device 102 can apply a constraint to the distances of each of the pixels from the boundary of each respective predefined imaging device gamut segment. Since certain highlighter colors are different (e.g., yellow and orange can appear softer than others) while magenta and orange are more visible, the constraints applied can be hue-slice dependent. Such thresholds can be predefined thresholds.

The constraints can include determining which pixels have distances from the boundary of the predefined imaging device color gamut hue segment that are greater than a threshold. In addition, the constraints can include determining which pixels include chroma correlate values and lightness correlate values that lie within a predetermined range of chroma correlate values and lightness correlate values, respectively, as is further described herein.

The imaging device 102 can determine which pixels have distances from the boundary of the predefined imaging device color gamut hue segment that exceed a threshold distance. Those pixels that include a distance that exceeds a threshold distance from the boundary of the predefined imaging device color gamut hue segment can be more likely that they are not reproducible by the printer of the imaging device 102 (e.g., as they lie further away from a particular hue segment of the printer color gamut). Accordingly, they are more likely to be highlighter marks. The imaging device 102 can determine which pixels of each hue segment of the plurality of pixels of the scanned image exceed a threshold distance from each corresponding hue segment of the predefined imaging device color gamut.

The imaging device 102 can determine which pixels include chroma correlate values and lightness correlate values that lie within predetermined ranges. For example, the imaging device 102 can compare, for each hue segment of the plurality of pixels of the scanned image, the chroma correlate values of each pixel included within each hue segment to a predetermined range of chroma correlate values. Further, the imaging device 102 can compare, for each hue segment of the plurality of pixels of the scanned image, the lightness correlate values of each pixel included within each hue segment to a predetermined range of lightness correlate values.

The imaging device 102 can determine which pixels are highlighter pixels (e.g., which pixels include the marking 108-1) based on those pixels that satisfy the constraints. For example, pixels included in the yellow hue segment of the scanned image that exceed a threshold distance from a boundary of the predefined yellow imaging device gamut segment, that include chroma correlate values that lie within a predetermined range of chroma correlate values, and that include lightness correlate values that lie within a predetermined range of lightness correlate values can be determined to be highlighter pixels. The imaging device 102 can determine which pixels are highlighter pixels for each hue segment of the plurality of pixels of the scanned image. That is, the imaging device 102 can iterate through all hue slices to determine the number of highlighter pixels in each hue slice.

The imaging device 102 can determine an amount of highlight hues that can be included as part of the marking 108-1. For example, the imaging device 102 can determine, in response to the number of determined highlighter pixels in each hue slice exceeding a threshold amount of highlighter pixels, that a hue segment includes a highlight hue.

The imaging device 102 can apply a classification model to the scanned image. As used herein, the term "classification model" refers to a model that draws a conclusion from a set of input values. The classification model can determine whether the physical medium 104-1 includes the particular marking 108-1 (e.g., the highlighter marking) based on the feature extraction process and other image characteristics. The classification model can be, in some examples, a Directed Acyclic Graph Support Vector Machine (DAGSVM) classification model, although examples of the disclosure are not limited to DAGSVM classification models. That is, the imaging device 102 can apply the classification model by applying a machine learning classifier to the scanned image. Such a classification model can be included in a firmware of the imaging device 102. Utilizing the classification model, the imaging device 102 can determine that the scanned image of the physical medium 104-1 includes the particular marking 108-1 (e.g., the highlighter marking).

The imaging device 102 can apply the classification model by applying a machine learning classifier to the gamut-based features as well as other image characteristics. For example, when the physical medium 104-1 is converted into a plurality of pixels, certain image characteristics can be determined for the plurality of pixels that comprise the scanned image. The imaging device 102 can, for instance, generate a histogram of the plurality of pixels of lightness correlate values and chroma correlate values. The image characteristics can therefore include luminance and chroma flatness scores that describe the spread of the histograms (e.g., a numerical difference between natural color image pixels and highlighter pixels), color variability scores (e.g., indicating color consistency by measuring heights of the bins comprising the histograms), text edge count (e.g., determined by counting an amount of the plurality of pixels that differ by 100 in gray value from their adjacent pixels), chroma around text (e.g., indicating a distribution of chroma around text edges of the plurality of pixels), color block ratio (e.g., based on determining an amount of color pixels in a particular non-overlapping pixel block with a threshold percentage of chromatic pixels (e.g., 10%)), and a white block count (e.g., based on determining an amount of non-overlapping white pixel blocks). Further, image characteristics can include information describing the lightness and chroma channels within a pixel block, such as minimum pixel block mean of the lightness channel, maximum pixel block standard deviation of the lightness channel, minimum pixel block skewness of the lightness channel, minimum pixel block mean of the chroma channel, maximum pixel block standard deviation of the chroma channel, and/or minimum pixel block skewness of the chroma channel.

As mentioned above, the imaging device 102 can apply a classification model to the scanned image. Application of the classification model to the scanned image can include utilizing the gamut-based feature as well as a combination of the above-described image characteristics. For example, the imaging device 102 can apply a classification model to the scanned image utilizing the gamut-based feature as well as lightness and chroma histogram flatness scores, color variability scores, text edge counts, chroma around text, color block ratios, white block ratios, minimum pixel block mean of the lightness channel, maximum pixel block standard deviation of the lightness channel, minimum pixel block skewness of the lightness channel, minimum pixel block mean of the chroma channel, maximum pixel block standard deviation of the chroma channel, and/or minimum pixel block skewness of the chroma channel, and/or combinations thereof. Further, such combinations thereof may be dependent on the type of imaging device 102, model of imaging device 102, etc.

The imaging device 102 can optimize the scanned image based on the classification of the scanned image for a print job. For example, the imaging device 102 can optimize the scanned image by modifying image quality settings to modify colors of the marking 108-1. In some examples, such modification of colors of the marking 108-1 can include modification to include colors for a print job that are within the printer color gamut of the imaging device 102. The imaginal device 102 may perform a print job utilizing the optimized scanned image. For instance, in an example in which the reproduced physical medium 104-2 is a physical medium printed during a print job, the imaging device 102 can perform the print job utilizing the optimized scanned image so that the reproduced content 106-2 is the same as the content 106-1 and the reproduced marking 108-2 (e.g., the highlighter marking) includes colors that are reproduced in a way that appear the same as the marking 108-1. In some examples, such modification of colors of the marking 108-1 can be performed for storage and/or transmission of the scanned image. For instance, the reproduced physical medium 104-2 may be a digital version of the originally scanned physical image 104-1 intended to be transmitted (e.g., via email, facsimile, eta), and the imaging device 102 can transmit such digital version including the optimized scanned image to include the content 106-1 and the reproduced marking 108-2 that includes colors that are reproduced in a way that appear the same as the marking 108-1. In such a manner, feature extractions to optimize scanned images according to the disclosure can allow for reliable reproduction of marks included on a scanned physical medium by automatic optimization, which can prevent a user from having to manually modify image quality settings.

As described above, the imaging device 102 can include a predefined imaging device color gamut for comparison with pixels included in the scanned image. As part of a training process, the imaging device 102 can generate the predefined imaging device gamut segments, as is further described herein.

The imaging device 102 can receive a scanned test image including a plurality of color patches. As used herein, the term "color patch" refers to a predefined area having a predefined color. The scanned test image can include a plurality of color patches that can be scanned by the scanner of the imaging device 102.

The imaging device 102 can plot mean color values for each of the plurality of color patches in an input color space of the scanned test image. For example, the imaging device 102 can determine a mean color value for a red color patch, a mean color value for a yellow color patch, a mean color value for a cyan patch, etc. Such mean color values can be determined in an input color space such as RGB.

After plotting the mean color values, the imaging device 102 can convert the plotted mean color values from the input color space to a polar coordinate representation of an opponent color space. For example, the imaging device 102 can convert the plotted mean color values from RGB to Lch by converting from RGB to CIE XYZ, from CIE XYZ to CIE L*a*b*, and finally from CIE L*a*b* to Lch. The imaging device 102 can segment the output color space into a plurality of hue segments for comparison to a scanned image, as previously described above, FIG. 2A is an example of a hue circle 210 including hue segments 212 for feature extractions to optimize scanned images consistent with the disclosure. As illustrated in FIG. 2A, the hue circle 210 can include twelve hue segments 212.

As previously described in connection with FIG. 1, an imaging device can segment an output color space of a plurality of pixels of a scanned image into a plurality of hue segments 212 that can each include a subset of pixels of the plurality of pixels. For example, as illustrated in FIG. 2A, the imaging device can segment the output color space into twelve non-overlapping 30-degree hue segments 212. Each of the hue segments 212 can include a subset of the plurality of pixels of the scanned image. For instance, hue segment 212-1 can include a subset of red pixels of the scanned image, hue segment 212-2 can include a subset of orange pixels of the scanned image, hue segment 212-3 can include a subset of yellow pixels of the scanned image, 212-4 can include a subset of chartreuse green pixels of the scanned image, 212-5 can include a subset of green pixels of the scanned image, 212-6 can include a subset of spring green pixels of the scanned image, 212-7 can include a subset of cyan pixels of the scanned image, 212-8 can include a subset of azure pixels of the scanned image, 212-9 can include a subset of blue pixels of the scanned image, 212-10 can include a subset of violet pixels of the scanned image, 212-11 can include a subset of magenta pixels of the scanned image, and 212-12 can include a subset of rose pixels of the scanned image.

The imaging device can determine which of the plurality of pixels (e.g., including in each subset of pixels) of the scanned image are highlighter pixels by determining a distance of each pixel from a boundary of a predefined imaging device gamut segment, as is further described in connection with FIG. 2B.

FIG. 2B is an example of an imaging device gamut segment 214 for feature extractions to optimize scanned images consistent with the disclosure. As illustrated in FIG. 2B, the imaging device gamut segment 214 can include a boundary 216 of the hue segment.

As illustrated in FIG. 2B, the imaging device gamut segment 214 can be an imaging device hue segment from −30-degrees to 0-degrees. Such a hue segment can be a predefined imaging device hue segment corresponding to a red color. The imaging device can compare a subset of pixels 218 from a hue segment from a scanned image to a corresponding predefined imaging device gamut segment 214 to determine a distance 220 from the subset of pixels 218 to a boundary 216. For example, as illustrated in FIG. 2B, the imaging device can compare pixels from a red hue segment of the scanned image to a red hue segment (e.g., corresponding to hue segment 212-1) included in the predefined imaging device hue segments to determine a distance 220 of the pixels 218 from the boundary 216 defining the predefined red imaging device hue segment. The imaging device can iterate this comparison process through all of the hue segments of the scanned image and all of the corresponding predefined imaging device hue segments to determine those pixels that are highlighter pixels (e.g., those pixels that exceed a threshold distance from the boundary of the predefined imaging device hue segments and that include chroma correlate values and lightness correlate values that are within a predetermined chroma correlate range and a predetermined lightness correlate range, respectively).

Figure 3:
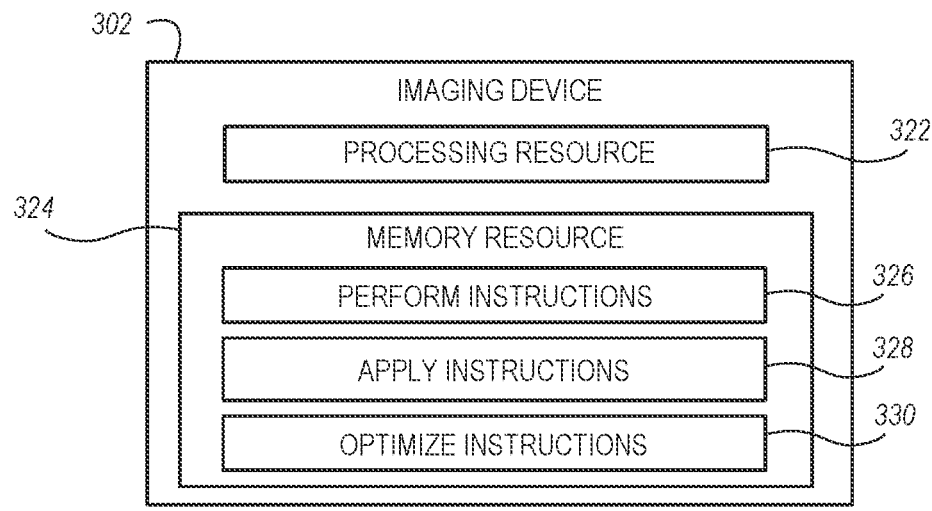
FIG. 3 is an example of an imaging device for feature extractions to optimize scanned images consistent with the disclosure.

FIG. 3 is an example of an imaging device 302 for feature extractions to optimize scanned images consistent with the disclosure. As described herein, the imaging device 302 may perform functions related to feature extractions to optimize scanned images. Although not illustrated in FIG. 3, the imaging device 302 may include a processor and a machine-readable storage medium, Although the following descriptions refer to a single processor and a single machine-readable storage medium, the descriptions may also apply to a system with multiple processors and multiple machine-readable storage mediums. In such examples, the imaging device 302 may be distributed across multiple machine-readable storage mediums and across multiple processors. Put another way, the instructions executed by the imaging device 302 may be stored across multiple machine-readable storage mediums and executed across multiple processors, such as in a distributed or virtual computing environment.

Processing resource 322 may be a central processing unit (CPU), a semiconductor-based microprocessor, and/or other hardware devices suitable for retrieval and execution of machine-readable instructions 326, 328, 330 stored in a memory resource 324. Processing resource 322 may fetch, decode, and execute instructions 326, 328, 330. As an alternative or in addition to retrieving and executing instructions 326, 328, 330, processing resource 322 may include a plurality of electronic circuits that include electronic components for performing the functionality of instructions 326, 328, 330.

Memory resource 324 may be any electronic, magnetic, optical, or other physical storage device that stores executable instructions 326, 328, 330, and/or data. Thus, memory resource 324 may be, for example, Random Access Memory (RAM), an Electrically-Erasable Programmable Read-Only Memory (EEPROM), a storage drive, an optical disc, and the like. Memory resource 324 may be disposed within imaging device 302, as shown in FIG. 3. Additionally, memory resource 324 may be a portable, external or remote storage medium, for example, that causes imaging device 302 to download the instructions 326, 328, 330 from the portable/external/remote storage medium.

The imaging device 302 may include instructions 326 stored in the memory resource 324 and executable by the processing resource 322 to perform a feature extraction process to extract a gamut-based feature included in a plurality of pixels of a scanned image to determine whether the scanned image includes a particular marking. The feature extraction process can include converting a color space of a plurality of pixels of the scanned image from an input color space to an output color space, segmenting the output color space into a plurality of hue segments each including a subset of pixels of the plurality of pixels having a particular hue, and determining which of the plurality of converted and segmented pixels are associated with a particular marking. The particular marking can be, for example, a highlighter marking included on a physical medium scanned to produce the scanned image.

The imaging device 302 may include instructions 328 stored in the memory resource 324 and executable by the processing resource 322 to apply a classification model to the scanned image. For example, the imaging device 302 can apply a DAGSVM machine-learning classification model to the gamut-based feature and utilize other image characteristics to classify the scanned image. The classes of the scanned image can include whether the scanned image includes a highlighter marking or not, whether the scanned image includes text, is a photo, includes a highlighter marking, or a combination thereof, etc.

Figure 4:
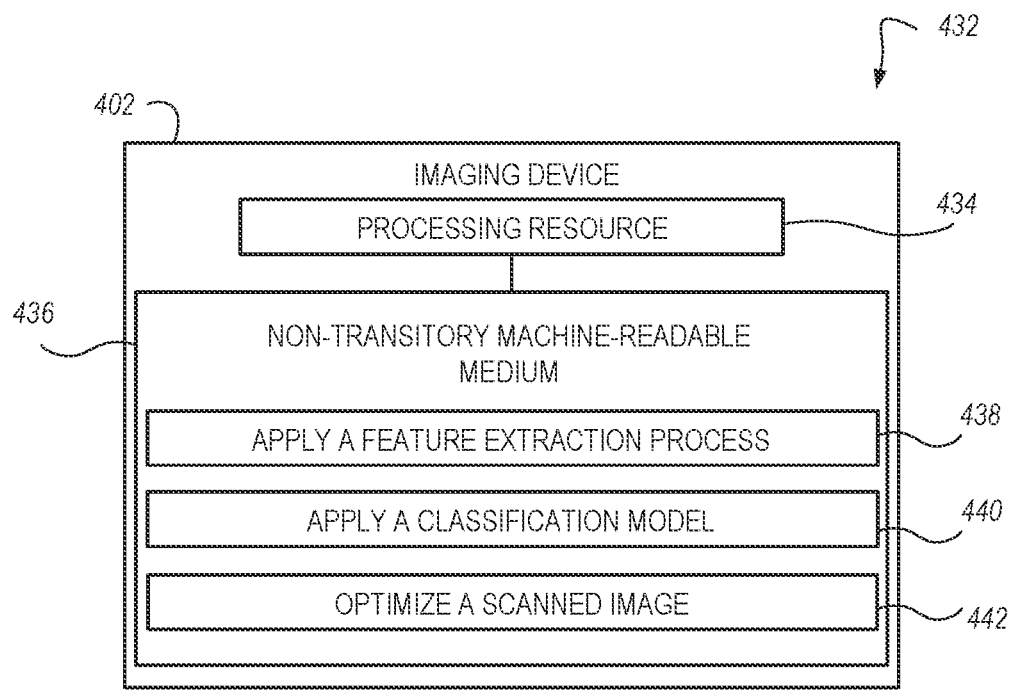
FIG. 4 is a block diagram of an example system for feature extractions to optimize scanned images consistent with the disclosure.

The imaging device 302 may include instructions 330 stored in the memory resource 324 and executable by the processing resource 322 to optimize the scanned image based on the classification of the scanned image. For example, the imaging device 302 can modify image quality settings to accurately reproduce the scanned image. In some examples, such an optimized reproduction can be utilized to ensure that colors included in the highlighter marking are within the printer color gamut of the imaging device 302 for a print job. In some examples, such an optimized reproduction can be utilized for transmission of the optimized reproduction, FIG. 4 is a block diagram of an example system 432 for feature extractions to optimize scanned images consistent with the disclosure. In the example of FIG. 4, system 432 includes an imaging device 402 including a processing resource 434 and a non-transitory machine-readable storage medium 433. Although the following descriptions refer to a single processing resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors, Put another way, the instructions may be stored across multiple machine-readable storage mediums and executed across multiple processors, such as in a distributed computing environment.

Processing resource 434 may be a central processing unit (CPU), microprocessor, and/or other hardware device suitable for retrieval and execution of instructions stored in the non-transitory machine-readable storage medium 436. In the particular example shown in FIG. 4, processing resource 434 may receive, determine, and send instructions 438, 440, 442. As an alternative or in addition to retrieving and executing instructions, processing resource 434 may include an electronic circuit comprising a number of electronic components for performing the operations of the instructions in the non-transitory machine-readable storage medium 436. With respect to the executable instruction representations or boxes described and shown herein, it should be understood that part or all of the executable instructions and/or electronic circuits included within one box may be included in a different box shown in the figures or in a different box not shown.

The non-transitory machine-readable storage medium 436 may be any electronic, magnetic, optical, or other physical storage device that stores executable instructions. Thus, non-transitory machine-readable storage medium 436 may be, for example, Random Access Memory (RAM), an Electrically-Erasable Programmable Read-Only Memory (EEPROM), a storage drive, an optical disc, and the like. The executable instructions may be "installed" on the system 432 illustrated in FIG. 4. Non-transitory machine-readable storage medium 436 may be a portable, external or remote storage medium, for example, that allows the system 432 to download the instructions from the portable/external/remote storage medium. In this situation, the executable instructions may be part of an "installation package".

Apply a feature extraction process instructions 438, when executed by a processor such as processing resource 434, may cause system 432 to apply a feature extraction process to extract a gamut-based feature included in a plurality of pixels of a scanned image. The feature extraction process can include converting a color space of the plurality of pixels of the scanned image from an input color space to an output color space, segmenting the output color space into a plurality of hue segments each including a subset of pixels of the plurality of pixels having a particular hue, and determining which of the plurality of converted and segmented pixels are associated with a highlighter marking of the scanned image.

Apply a classification model instructions 440, when executed by a processor such as processing resource 434, may cause system 432 to apply a classification model to the scanned image. For example, the imaging device 402 can apply a DAGSVM machine-learning classification model to the gamut-based feature and utilize other image characteristics to classify the scanned image. The classes of the scanned image can include whether the scanned image includes a highlighter marking or not, whether the scanned image includes text, is a photo, includes a highlighter marking, or a combination thereof, etc.

Optimize a scanned image instructions 442, when executed by a processor such as processing resource 434, may cause system 432 to optimize the scanned image based on the classification of the scanned image. In some examples, the imaging device 402 can modify image quality settings to optimize the scanned image to accurately reproduce the scanned image. In some examples, such an optimized reproduction can be utilized to ensure that colors included in the highlighter marking are within the printer color gamut of the imaging device 402. In some examples, such an optimized reproduction can be utilized for transmission of the optimized reproduction.

Figure 5:
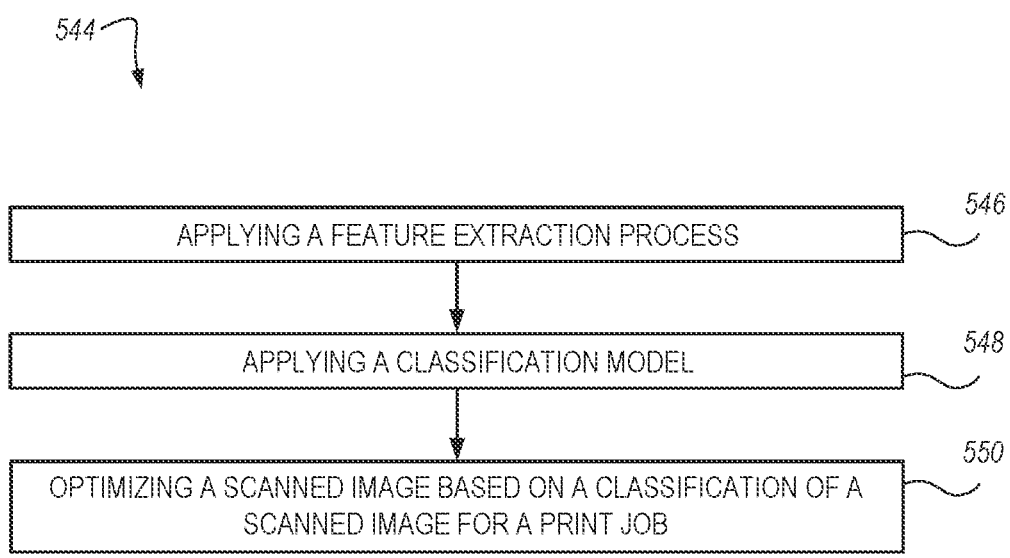
FIG. 5 is an example of a method for feature extractions to optimize scanned images consistent with the disclosure.

FIG. 5 is an example of a method 544 for feature extractions to optimize scanned images consistent with the disclosure. The method 544 can be performed by an imaging device (e.g., imaging device 102, 302, and 402, previously described in connection with FIGS. 1, 3, and 4, respectively).

At 546, the method 544 includes applying a feature extraction process. The feature extraction process can include converting a color space of the plurality of pixels of the scanned image from an input color space to a polar coordinate representation of an opponent color space, segmenting the polar coordinate representation of the opponent color space into a plurality of hue segments each including a subset of pixels of the plurality of pixels having a particular hue, comparing each pixel of the plurality of pixels in each hue segment of the plurality of hue segments with a corresponding hue segment included in predefined imaging device gamut segments to determine a distance of each pixel from a boundary of each respective predefined imaging device gamut segment, and determining whether the distances of each pixel from the boundary of each respective predefined imaging device gamut segment satisfy constraints to determine which of the plurality of pixels are highlighter pixels.

At 548, the method 544 includes applying a classification model to the scanned image including the highlighter pixels. For example, the imaging device can apply a DAGSVM machine-learning classification model to the gamut-based feature and utilize other image characteristics to classify the scanned image. The classes of the scanned image can include whether the scanned image includes a highlighter marking or not, whether the scanned image includes text, is a photo, includes a highlighter marking, or a combination thereof, etc.

At 550, the method 544 includes optimizing the scanned image based on the classification of the scanned image for a print job. For example, the imaging device can modify image quality settings to ensure that colors included in the highlighter marking are within the printer color gamut of the imaging device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 100 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An imaging device, comprising:
   a processing resource; and
   a memory resource storing non-transitory machine-readable instructions to cause the processing resource to:
      perform a feature extraction process to extract a gamut-based feature included in a plurality of pixels of a scanned image to determine whether the scanned image includes a particular marking;
      apply a classification model to the scanned image; and
      optimize the scanned image based on the classification of the scanned image.

2. The imaging device of claim 1, including instructions to cause the processing resource to perform the feature extraction process by converting a color space of the plurality of pixels of the scanned image from an input color space to an output color space.

3. The imaging device of claim 2, including instructions to cause the processing resource to segment the output color space into a plurality of hue segments each including a subset of pixels of the plurality of pixels.

4. The imaging device of claim 3, including instructions to cause the processing resource to compare, for each hue segment of the plurality of hue segments, each corresponding subset of the subset of pixels with a predefined imaging device color gamut to determine whether the scanned image includes the particular marking.

5. The imaging device of claim 1, wherein the particular marking is a highlighter marking.

6. The imaging device of claim 1, wherein the classification model is included in a firmware of the imaging device.

7. The imaging device of claim 1, including instructions to cause the processing resource to apply the classification model by applying a machine learning classifier to the scanned image.

8. A non-transitory machine-readable storage medium including instructions that when executed cause a processing resource to:
   apply a feature extraction process to extract a gamut-based feature included in a plurality of pixels of a scanned image by:
      converting a color space of the plurality of pixels from an input color space to an output color space;
      segmenting the output color space into a plurality of hue segments each including a subset of pixels of the plurality of pixels; and
      determining which of the plurality of converted and segmented pixels are associated with a highlighter marking of the scanned image;
   apply a classification model to the scanned image; and
   optimize the scanned image based on the classification of the scanned image.

9. The non-transitory storage medium of claim 8, wherein the instructions to determine which of the plurality of converted and segmented pixels are associated with the highlighter marking include instructions to compare each pixel of the plurality of pixels in each hue segment of the plurality of hue segments with predefined imaging device gamut segments to determine a distance of each pixel from a boundary of each respective predefined imaging device gamut segment.

10. The non-transitory storage medium of claim 9, including instructions to apply a constraint to the distances of each of the pixels from the boundary of each respective predefined imaging device gamut segment.

11. The non-transitory storage medium of claim 10, including instructions to:
   determine pixels that satisfy the constraint to be highlighter pixels; and
   determine pixels that do not satisfy the constraint to not be highlighter pixels.

12. A method, comprising:
   applying, by an imaging device, a feature extraction process including:
      converting a color space of a plurality of pixels of a scanned image from an input color space to a polar coordinate representation of an opponent color space;
      segmenting the polar coordinate representation of the opponent color space into a plurality of hue segments each including a subset of pixels of the plurality of pixels;
      comparing each pixel of the plurality of pixels in each hue segment of the plurality of hue segments with a corresponding hue segment included in predefined imaging device gamut segments to determine a distance of each pixel from a boundary of each respective predefined imaging device gamut segment; and
      determining whether the distances of each pixel from the boundary of each respective predefined imaging device gamut segment satisfy constraints to determine which of the plurality of pixels are highlighter pixels;
   applying a classification model to the scanned image; and
   optimizing the scanned image based on the classification of the scanned image for a print job.

13. The method of claim 12, wherein determining which of the plurality of pixels are highlighter pixels in response to:
   the distance of a pixel from a boundary of a respective predefined imaging device gamut segment exceeds a threshold distance;
   a chroma correlate value of the pixel being within a predetermined range of chroma correlate values; and
   a lightness correlate value of the pixel being within a predetermined range of lightness correlate values.

14. The method of claim 12, wherein the method includes generating the predefined imaging device gamut segments by:
- receiving, by the imaging device, a scanned test image including a plurality of color patches;
- plotting, by the imaging device, mean color values of each of the plurality of color patches in an input color space of the scanned test image; and
- converting, by the imaging device, the plotted mean color values from the input color space to a polar coordinate representation of an opponent color space.

15. The method of claim 12, wherein the method includes performing, by the imaging device, the print job utilizing the optimized scanned image.

* * * * *